United States Patent [19]

Tamburelli

[11] 4,288,872

[45] Sep. 8, 1981

[54] EQUALIZER FOR THE CORRECTION OF DIGITAL SIGNALS

[75] Inventor: Giovanni Tamburelli, Turin, Italy

[73] Assignee: CSELT - Centro Studi e Laboratori Telecomunicazioni S.p.A., Turin, Italy

[21] Appl. No.: 148,237

[22] Filed: May 9, 1980

[30] Foreign Application Priority Data

May 11, 1979 [IT] Italy .............................. 67999 A/79

[51] Int. Cl.³ ...................... H03K 5/159; H04B 3/04; H04L 25/03
[52] U.S. Cl. ...................................... 375/14; 333/18; 364/724
[58] Field of Search .......................... 333/18; 364/724; 178/69 R; 375/12, 14, 15, 16

[56] References Cited

U.S. PATENT DOCUMENTS

| | | | |
|---|---|---|---|
| 4,020,333 | 4/1977 | Nussbaumer | 364/724 |
| 4,034,196 | 7/1977 | Butterwreck et al. | 364/724 |
| 4,170,758 | 10/1979 | Tamburelli | 375/14 |

OTHER PUBLICATIONS

"Error-Rate Improvement Through Digital Decision in Pulse Transmissions", by T. Osatake et al., Electronics and Communications in Japan, vol. 49, No. 10, Oct. 1966, pp. 28-35.
"Decision Feedback and Feedforward Received (For Rates Faster Than Nyquist's)", by G. Tamburelli, CSELT Rapporti Tecnici, No. 2, Jun. 1976.
"Nonlinear Equalizer with Shaping Filter for Optical Fibers", by G. Tamburelli, CSELT Rapporti tecnici, No. 4, Sep. 1977.

Primary Examiner—Benedict V. Safourek
Attorney, Agent, or Firm—Karl F. Ross

[57] ABSTRACT

An equalizer designed to correct both precursor and postcursor distortion in signal samples periodically obtained from a digital signal train comprises two parallel, mutually complementary circuit branches each including an upstream filter for linearly correcting one type of distortion and a downstream cell for nonlinearly compensating the other type of distortion. The compensating cell of the first branch includes an adder algebraically combining a feed-forward signal with a signal at least partly freed from postcursor interference in the corresponding upstream filter; the second branch includes another adder algebraically combining a feedback signal from its compensating cell with a prefiltered signal at least partly freed from precursor interference. Purged signals from both adders are combined in a summing stage followed by a decision unit which emits a quantized pulse to be used either directly as a decided symbol or as a source of corrective pulses for postcursor and precursor elimination in another linearly prefiltered sample.

7 Claims, 5 Drawing Figures

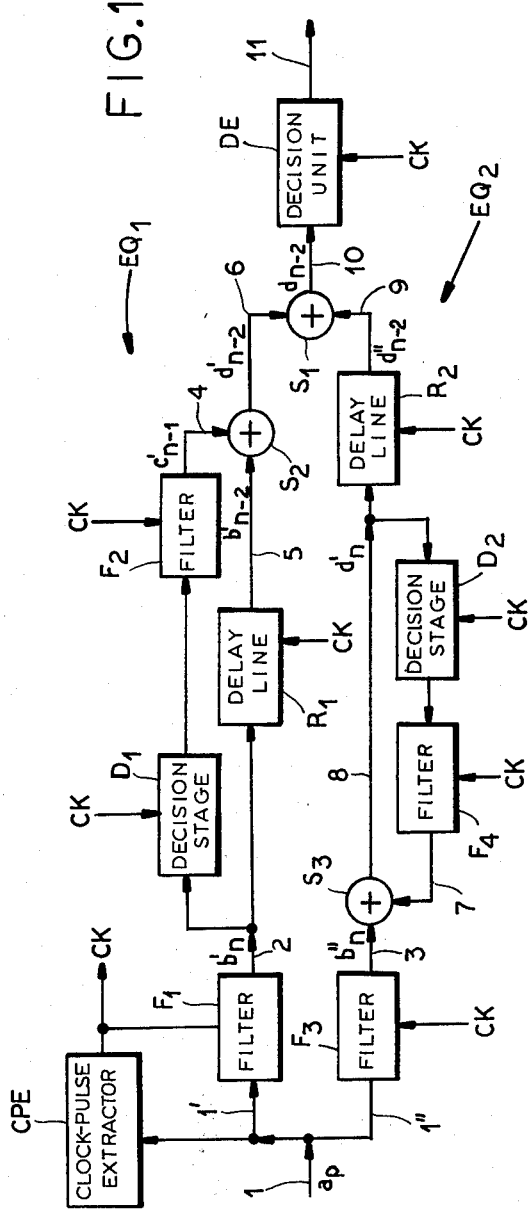
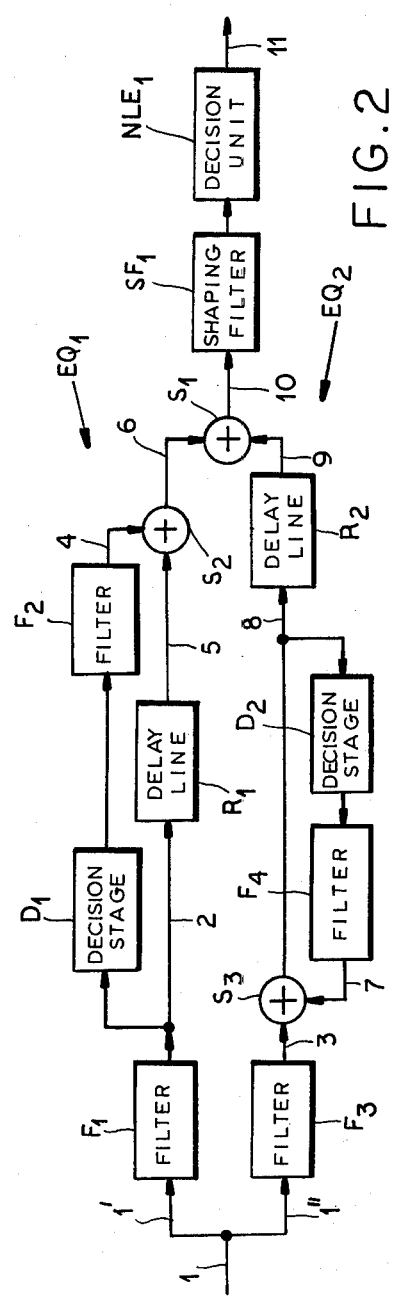
FIG.1
FIG.2

EQUALIZER FOR THE CORRECTION OF DIGITAL SIGNALS

FIELD OF THE INVENTION

My present invention relates to digital transmission systems and more particularly to an equalizer for the correction of digital signals at the receiving end of a transmission path, designed to enable transmission at speeds greater than twice Nyquist's rate.

BACKGROUND OF THE INVENTION

In high-speed digital transmission the degradation of the signal is mainly due to the so-called "intersymbol interference" caused by the fact that, owing to non-ideal characteristics of the transmission channel, every pulse containing the digital information is associated with leaders or precursors and with tails or postcursors which overlap and distort adjacent pulses. Such interference, increasing sharply with speeds exceeding twice the Nyquist rate, significantly enhances the probability of incorrect decisions on pulse levels at the receiving end of the transmission path. The resulting distortions of the conveyed intelligence is the greatest obstacle to a fuller utilization of available transmission lines.

In my prior U.S. Pat. No. 4,170,758 and in my copending application Ser. No. 065,468, filed Aug. 10, 1979, I have disclosed an equalizer of the nonlinear type designed to compensate for both precursor and postcursor effects. Reference may also be made to the art of record in that prior patent, including an article by Tonau Osatake and Hidehiko Tanaka entitled "Error-Rate Improvement Through Digital Decision in Pulse Transmissions," Electronics and Communications in Japan, Vol. 49, No. 10, published October 1966 (pages 28–35).

The term "nonlinear equalization" refers to a circuit arrangement in which a distorted incoming signal is fed to a decision stage which converts it, on the basis of predetermined threshold levels, into a quantized pulse supplied to a filter (e.g. one of the well-known transversal type) deriving therefrom an estimated feedback or feed-forward pulse for postcursor or precursor compensation of a succeeding or a preceding signal, respectively. Linear filtering, on the other hand, dispenses with the decision stage so that the corrective pulses are of analog character. An advantage of the nonlinear technique is the reduced error rate in the last quantizing step to which the corrected signal is subjected in a final decision unit. Any error that does occur in an earlier threshold stage, however, is likely to proliferate in the processing of subsequent signals.

OBJECT OF THE INVENTION

The object of my present invention, therefore, is to provide an improved equalizer for correcting a train of incoming digital signals in a manner minimizing the risk of perpetuation of a decision error.

SUMMARY OF THE INVENTION

I have found, in accordance with my present invention, that this object can be achieved by a combination of linear and nonlinear filtering techniques carried out simultaneously in two parallel circuit branches whose outputs are then combined to yield a resulting pulse which can be readily quantized, e.g. translated into either one of two binary levels. Thus, my improved equalizer comprises a first and a second circuit branch connected in parallel to a transmission path via receiving means supplying them with incoming samples periodically obtained from a train of digital message signals. The first branch includes a first filter converting a given signal sample into a first linearly prefiltered signal in which the postcursor effects are at least partially suppressed, this prefiltered signal being supplied to a first threshold stage deriving therefrom a first quantized pulse from which a second filter generates a precursor-compensating signal. With the aid of first delay means connected to the first filter, a retarded signal corresponding to the first prefiltered signal is fed to a first adder algebraically combining this retarded signal with the precursor-compensating signal from the second filter so as to produce a first purged signal. The second branch includes a third filter converting the same signal sample into a second linearly prefiltered signal in which the precursor effects are at least partially suppressed, the second prefiltered signal being supplied by way of a second adder to an input end of a feedback loop in which a second quantized pulse is generated by a second threshold stage and is fed to a fourth filter delivering a postcursor-compensating signal to the second adder at a point upstream of the input end of the feedback loop. With the aid of second delay means, connected to the second adder downstream of that input end, a second purged signal temporally correlated with the first purged signal is generated in this second circuit branch, the two purged signals being supplied to a summing stage which algebraically combines them into a resulting signal delivered to a decision unit for conversion into a quantized output pulse.

Thus, the resulting signal arriving at the decision unit is the sum of two components which are derived from the same incoming signal sample and have both undergone, in a mutually complementary manner, a two-step correction of precursor as well as postcursor distortion. Since the first step is performed by linear filtering, only the second step could be affected by a possible decision error which, however, is not likely to occur at the same time in both circuit branches. This second step affords the higher fidelity of nonlinear filtering before the resulting signal is measured against the threshold or thresholds of the final decision unit; the latter unit may be preceded, however, by a shaping filter designed to suppress residual distortions.

It should be noted that the decided pulse in the output of the final decision unit need not be utilized directly as a decided symbol but could be employed, with the aid of pulse-generating means connected to that unit, as a source of one or two corrective signals serving to eliminate precursor and/or postcursor effects from an incoming signal sample adjacent the sample or samples originating the corrective signal or signals. The adjacent sample is obtained from the receiving means through circuitry advantageously performing thereon a linear interference suppression complementary to that carried out by one or more algebraic units or adders to which the adjacent sample is supplied along with the corrective signal or signals, temporally correlated therewith through supplemental delay means, from the aforementioned pulse-generating means. Thus, when the corrective signal is derived from an originating sample preceding the adjacent sample in order to enable the compensation of postcursor effects in the latter sample, the circuitry extracting the adjacent sample from the receiving means may subject this sample to linear precursor filtering; conversely, an adjacent sample preceding the originating sample may undergo linear postcursor filtering in that circuitry before being subjected to precursor compensation by a corrective signal from the pulse-generating means. Best results are achieved when the same adjacent sample, traveling simultaneously over a third and a fourth circuit branch, experiences complementary linear corrections in these two branches before being combined with corrective signals, respectively derived from a preceding and a succeeding originating sample, in a third and a fourth adder emitting third and fourth purged signals to be merged into a compensated signal by an additional summing stage working into another decision unit which quantizes the compensated signal to produce a decided symbol.

BRIEF DESCRIPTION OF THE DRAWING

These and other features of my present invention will now be described in detail, reference being made to the accompanying drawing in which:

FIG. 1 is a block diagram of an equalizer according to my present invention;

FIG. 2 is a similar block diagram illustrating a modification;

SPECIFIC DESCRIPTION

Figure 3:
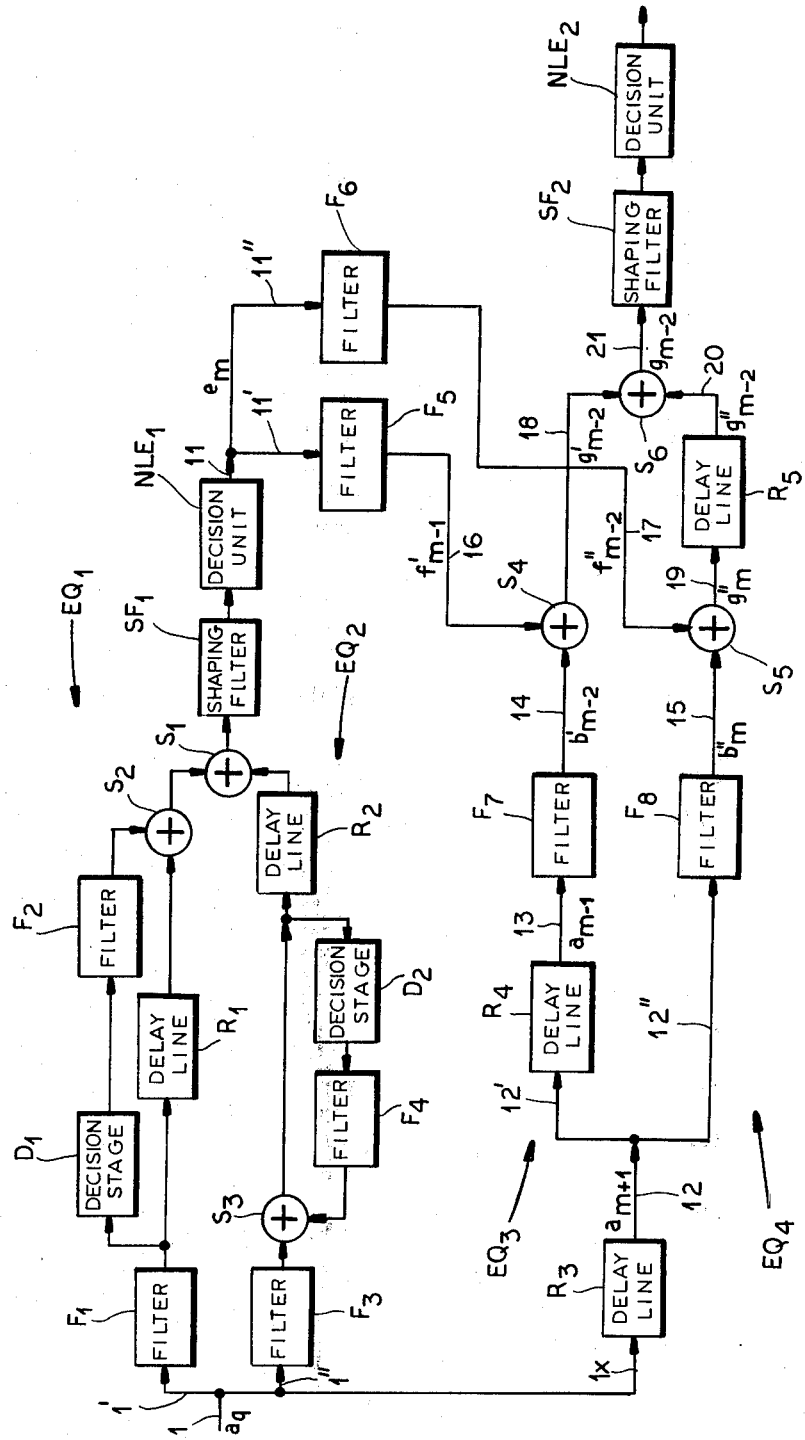
FIG. 3 is a block diagram of a more elaborate equalizer according to my invention.

FIGS. 1 and 2 show an equalizer at the receiving end of a transmission path 1 for eliminating precursor and postcursor interference from a train of incoming digital signals having a recurrence period T. The equalizer comprises two parallel circuit branches $EQ_1$, $EQ_2$ connected at their input ends to receiving means, simply represented as extensions 1' and 1" of transmission path 1, and at their output ends, via respective leads 6 and 9, to an algebraic adder or final summing stage $S_1$. Each circuit branch $EQ_1$, $EQ_2$ has an upstream filter $F_1$, $F_3$ for respectively subjecting each incoming sample to linear suppression of postcursor and precursor effects. Preferably, filters $F_1$, $F_3$ are of the transversal type and introduce delays dependent on the numbers of interfering postcursor and precursor constituents of adjacent symbols. For simplicity's sake it may be assumed that these numbers are equal; if they are unequal, a delay line may be inserted either upstream or downstream of one of the filters $F_1$, $F_3$ to ensure that prefiltered signals appearing on output leads 2 and 3 of filters $F_1$ and $F_3$ at any instant pertain to the same incoming message sample.

Lead 2 extends to a delay line $R_1$ and to a threshold unit or ancillary decision stage $D_1$ which in turn works into a filter $F_2$. In response to the partially postcursor-compensated signals emitted by filter $F_1$, unit $D_1$ generates quantized (e.g. binary) pulses from which filter $F_2$ derives precursor-compensating signals on the basis of the known characteristics of transmission path 1. The complexity of filter $F_2$, i.e. the number of taps yielding estimated corrective pulses, will depend on the number of succeeding symbols significantly affecting a given message sample; this number increases with the transmission rate. With only one interfering precursor to be compensated, filter $F_2$ is reduced to a simple multiplier.

Delay line $R_1$ retards the prefiltered signal on lead 2 by a time that exceeds by a sampling or recurrence period T the combined operating time of decision stage $D_1$ and filter $F_2$. Delay line $R_1$ and filter $F_2$ are connected via respective output leads 5 and 4 to a conventional two-input, one-output digital adder $S_2$ which algebraically combines the linearly prefiltered signal from delay line $R_1$ with a feed-forward signal derived by filter $F_2$ to compensate for precursor distortion. Adder $S_2$ emits on output lead 6 of circuit branch $EQ_1$ a corrected signal at least partially purged of both precursor and postcursor interference. Elements $R_1$, $D_1$, $F_2$, $S_2$ downstream of filter $F_1$ constitute a first nonlinear compensation cell.

Output lead 3 of filter $F_3$ is tied to another conventional two-input, one-output digital adder $S_3$ which algebraically combines a linearly prefiltered signal from filter $F_3$ with a postcursor-compensating signal arriving over a lead 7 from a feedback loop including a filter $F_4$ similar in structure to filter $F_2$. Filter $F_4$ receives quantized pulses from a threshold unit or ancillary decision stage $D_2$ connected at an input end of the feedback loop to an output lead 8 of adder $S_3$. From this quantized pulse, filter $F_4$ estimates the magnitudes of interfering postcursors according to the characteristics of the transmission path 1 in order to generate a suitable compensating signal. Elements $D_2$, $S_3$, $F_4$ downstream of filter $F_3$ constitute a second nonlinear compensation cell.

The output lead 8 of adder $S_3$ is connected to the input lead 9 of adder $S_1$ via a delay line $R_2$ introducing a lag equal to that of line $R_1$ and exceeding the delay of the feedback loop $D_2$, $F_4$. Thus, adder $S_1$ simultaneously receives over leads 6 and 9 two purged signals originated by the same incoming sample. Adder $S_1$ has an output lead 10 extending either directly to a conventional threshold device or decision unit DE, FIG. 1, or through a shaping filter $SF_1$ into a nonlinear equalization device $NLE_1$, FIG. 2, including such a unit. Shaping filter $SF_1$ advantageously reduces postcursor effects arising between consecutively arriving samples and may be of the type described by me in a paper entitled "Nonlinear Equalizer with Shaping Filter for Optical Fibers" published by the assignee of this invention (CSELT Technical Reports, vol. V, No. 4, September 1977); see also my copending application Ser. No. 065,468 referred to above. Equalization device $NLE_1$ emits decided symbols or pulses of predetermined signal levels; device $NLE_1$ may take the form described by me in a paper entitled "Decision Feedback and Feedforward Receiver (for rates faster than Nyquist's)" published in CSELT Technical Reports, vol. IV, No. 2, June 1976.

A time base CPE is connected to transmission path 1 for extracting clock pulses CK from the incoming data stream to establish a succession of intervals of uniform duration equal to the recurrence period T. Time base CPE is also connected to the various circuit components for controlling their operations.

In the following description of the mode of operation of my improved equalizer, subscripts m, n, p, q will be used to designate signal samples taken at different times (but not necessarily in immediately consecutive recurrence periods T) from the data stream. Delays by one or two periods T with reference to a sampling time nT will be denoted by subscripts n−1 and n−2, respectively.

Only some of the signals so labeled, referred to hereinafter, have been indicated in the drawing.

In response to a sample $a_n$ arriving at the receiving end of transmission path 1 at time nT, filters $F_1$, $F_3$ emit signals $b'_n$, $b''_n$ linearly compensated for postcursor and precursor effects, respectively. Signals $b'_n$ and $b''_n$ appear at an instant pT (p>n) which sees the reception of another incoming sample $a_p$ by filters $F_1$ and $F_3$. For simplicity's sake it will be assumed that the combined delay time of decision unit $D_1$ and filter $F_2$ is equal to T. At the same instant pT the filter $F_2$ produces a feed-forward signal $c'_{n-1}$, adapted to compensate precursor interference caused in a sample $a_{n-1}$ by a subsequent sample $a_{n-2}$, while delay line $R_1$ emits on lead 5 a signal $b'_{n-2}$ representing the sample $a_{n-2}$ after postcursor correction by filter $F_1$. The prefiltered signal $b'_{n-2}$ and the feed-forward signal $c'_{n-1}$ are algebraically combined by adder $S_2$ to produce on output lead 6 a first purged signal $d'_{n-2}$ at least partially free from precursor and postcursor effects.

Precursor-compensated signal $b''_n$ is algebraically combined in adder $S_3$ with a feedback signal $c''_{n-1}$ derived by decision stage $D_2$ and filter $F_4$ from a signal $d''_{n-1}$ on lead 8 for correcting postcursor interference in sample $a_n$ due to the preceding sample $a_{n-1}$ (the delay of feedback loop $D_2$, $F_4$ is assumed to be equal to T). Adder $S_3$ then emits on lead 8 a second purged signal $d''_n$ at least partially free from precursor and postcursor interference. Also at time pT, delay line $R_2$ transmits to adder $S_1$ a purged signal $d''_{n-2}$ previously derived by adder $S_3$ from sample $a_{n-2}$. The two temporally correlated signals $d'_{n-2}$ and $d''_{n-2}$ are summed in adder $S_1$ to form a resulting signal $d_{n-2}$ fed to decision unit DE (FIG. 1) or to shaping filter $SF_1$ and equalization device $NLE_1$ (FIG. 2) for quantization.

As already indicated, the provision of parallel interference-compensating circuit branches $EQ_1$, $EQ_2$ minimizes error proliferation due to feedback. Thus, for example, a decision error made by stage $D_2$ is likely to be repeated by unit DE (or $NLE_1$) because, on the one hand, the latter operates on signals which as the sums of two pulses are subject to wider variations in amplitude and because, on the other hand, the probability is very low that an error would concurrently arise in both parallel branches. The equalizer shown in FIG. 1 or 2 is particularly useful in systems for the transmission of bit groups having self-correcting codes, i.e. parity bits, for detecting and eliminating single-bit errors.

Nonlinear device $NLE_1$ advantageously implements further interference compensation and permits greater tolerance in the corrections performed by the two branches $EQ_1$, $EQ_2$.

As illustrated in FIG. 3, circuit branches $EQ_1$, $EQ_2$ are advantageously connected in parallel with another pair of such branches $EQ_3$, $EQ_4$. The latter include a common delay line $R_3$ coupled to an extension 1x of transmission path 1 for retarding incoming samples by a period T, causing them to lead by one such period the output signals of branches $EQ_1$, $EQ_2$. Thus, when a decided symbol $e_m$ corresponding to a sample $a_m$ is present on an output lead 11 of decision unit $NLE_1$, an output lead 12 of delay line $R_3$ carries an adjacent sample $a_{m+1}$ with a peak arriving subsequently to that of sample $a_m$.

Two filters $F_5$, $F_6$, which may be of the same structure as filters $F_2$, $F_4$, have inputs tied to respective extensions 11', 11'' of lead 11. In response to the decided symbol or pulse $e_m$, and in accordance with the predetermined characteristics of the transmission path, filters $F_5$ and $F_6$ generate on respective output leads 16 and 17 a corrective feed-forward signal $f'_m$ and a corrective feedback signal $f''_m$ adapted to compensate precursor and postcursor effects in adjacent samples $a_{m-1}$ and $a_{m+1}$, respectively. In general, the complexity of filters $F_5$, $F_6$ and the delays introduced thereby will again depend on the number of interfering signal components encumbering each incoming sample, yet in the present instance these delays are assumed to equal one recurrence period T. Thus, when lead 11 carries pulse $e_m$, leads 16 and 17 transmit corrective signals $f'_{m-1}$ and $f''_{m-1}$ derived from a prior decided symbol or pulse $e_{m-1}$.

Branches $EQ_3$, $EQ_4$ further include respective linear filters $F_7$, $F_8$, which may have the structure of filters $F_1$, $F_3$, for respectively precompensating postcursor and precursor distortions. Filter $F_8$ has its input directly joined to an extension 12'' of lead 12 whereas another delay line $R_4$ is inserted between an extension 12' of that lead and filter $F_7$. Line $R_4$ retards incoming samples by a time 2T and has an output lead 13 working into filter $F_7$. Filters $F_7$ and $F_8$ in turn have output leads 14 and 15 extending to a pair of conventional two-input, one-output digital adders $S_4$ and $S_5$ receiving feed-forward and feedback signals from filters $F_5$ and $F_6$ via leads 16 and 17; the output lead 18 of adder $S_4$ is connected to yet another two-input, one-output digital adder or final summing stage $S_6$ while the output lead 19 of adder $S_5$ extends to a delay line $R_5$ coupled to adder $S_6$ via a lead 20. Line $R_5$ retards signals from adder $S_5$ by a time 2T to ensure that third and fourth purged signals present on leads 18 and 20 pertain to the same incoming sample.

An output lead 21 of adder $S_6$ extends to a shaping filter $SF_2$ similar to filter $SF_1$ which in turn works into a decision unit $NLE_2$ similar to device $NLE_1$.

Let us assume that at an instant qT (q>m) the decided pulse $e_m$ is present on lead 11 while the receiving end of transmission path 1 carries an incoming signal sample $a_q$. As heretofore described, leads 16 and 17 carry feed-forward and feedback signals $f'_{m-1}$ and $f''_{m-1}$ derived from a decided pulse $e_{m-1}$ for respectively compensating precursor and postcursor effects due to sample $a_{m-1}$ in samples $a_{m-2}$ and $a_m$. At the same instant qT the leads 12'' and 13 transmit samples $a_{m+1}$ and $a_{m-1}$ whereas filters $F_7$ and $F_8$ emit linearly prefiltered signals $b'_{m-2}$ and $b''_m$ corresponding to samples $a_{m-2}$ and $a_m$, respectively, it being assumed that filters $F_7$ and $F_8$ have operating times equal to T. Adder $S_4$ algebraically combines the prefiltered signal $b'_{m-2}$ with feed-forward signal $f'_{m-1}$ to produce on output lead 18 a purged signal $g'_{m-2}$ representing the sample $a_{m-2}$ upon at least partial removal of both precursor and postcursor effects. Simultaneously, adder $S_5$ combines the signals on leads 15 and 17 to generate a purged signal $g''_m$ at least partially purged of both types of interference. Lead 20 carries a purged signal $g''_{m-2}$ emitted by adder $S_5$ at instant (q-2)T. Signals $g'_{m-2}$ and $g''_{m-2}$ are algebraically combined by adder $S_6$ to form a compensated signal $g_{m-2}$ fed to shaping filter $SF_2$ and decision unit $NLE_2$.

Unit $NLE_2$ may further eliminate both precursor and postcursor effects or, in a simpler case, reduce only one type of interference. Thus, for example, it may take the form of a Viterbi receiver which evaluates a sequence of pulses to purge same of postcursors. Such a receiver operates according to the Viterbi algorithm, estimating the state sequence of a discrete-time finite-state Markov process, as described by G. D. Forney in a paper entitled "The Viterbi Algorithm," *Proceedings of the IEEE*, vol. 61, No. 3, March 1973.

A higher reliability and a still further reduction in error probability may be attained by connecting equalization device $NLE_2$ to a further pair of parallel interference-compensating circuits similar to branches $EQ_3$ and $EQ_4$. Any number of such parallel branch pairs may be cascaded in this manner. It is also possible to insert in branches $EQ_1$ and $EQ_2$ further nonlinear compensation cells. In particular, a further decision unit similar to stage $D_1$, another filter like component $F_2$, an additional delay line similar to line $R_1$ and another digital adder may be included in branch $EQ_1$ between adders $S_2$ and $S_1$; in such a case, delay line $R_2$ of branch $EQ_2$ will take into account the operating time of the additional compensation cell. Alternatively, or conjointly therewith, at least one pair of equalization circuits similar to these branches may be inserted between adder $S_1$ and decision unit DE or $NLE_1$.

Figure 4:
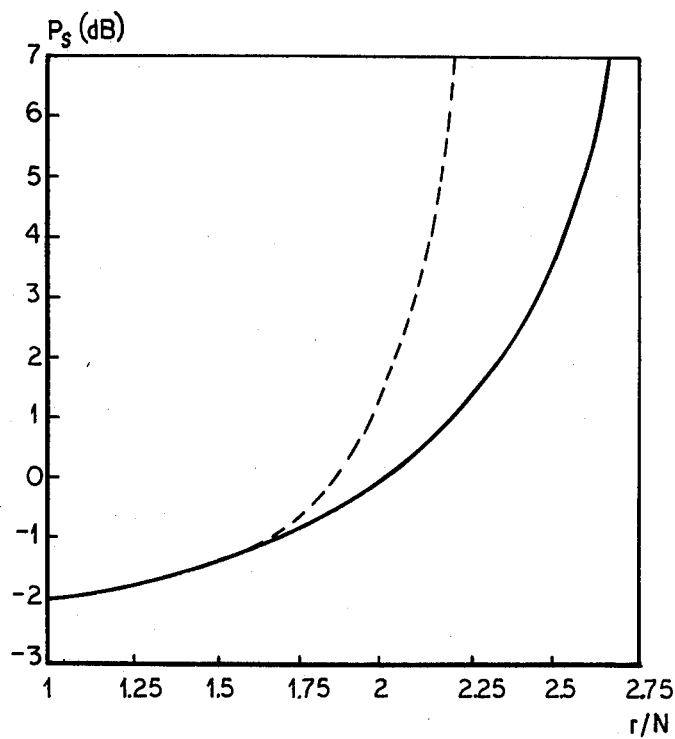
FIG. 4 is a graph of sensitivity loss plotted against the transmission rate for a known equalizer and for the equalizer of FIG. 2.

FIG. 4 is a diagram of the sensitivity loss $P_s$ in decibels (dB) versus the ratio r/N of the transmission rate r and Nyquist's rate N, for the equalizer of FIG. 2 (solid line), embodying my invention, and for a conventional equalizer (dashed line) incorporating only elements such as $F_3$, $F_4$, $D_2$, $S_3$ to perform a linear precursor correction followed by a nonlinear postcursor compensation involving decision feedback. It will be seen that a loss of 2 to 3 dB corresponds to a rate of about r=2N in the prior-art system as compared with about 2.25 to 2.5 N in my improved equalizer which, therefore, yields better equalization than the conventional one at a given transmission rate and facilitates transmission at higher rates without a proportionate increase in error incidence and signal degradation. Moreover, because the slope of the full-line curve is less than that of the dashed-line curve, minor fluctuations in transmission rate do not cause as great a quality variation for the equalizer according to my present invention as for the prior-art system.

Figure 5:
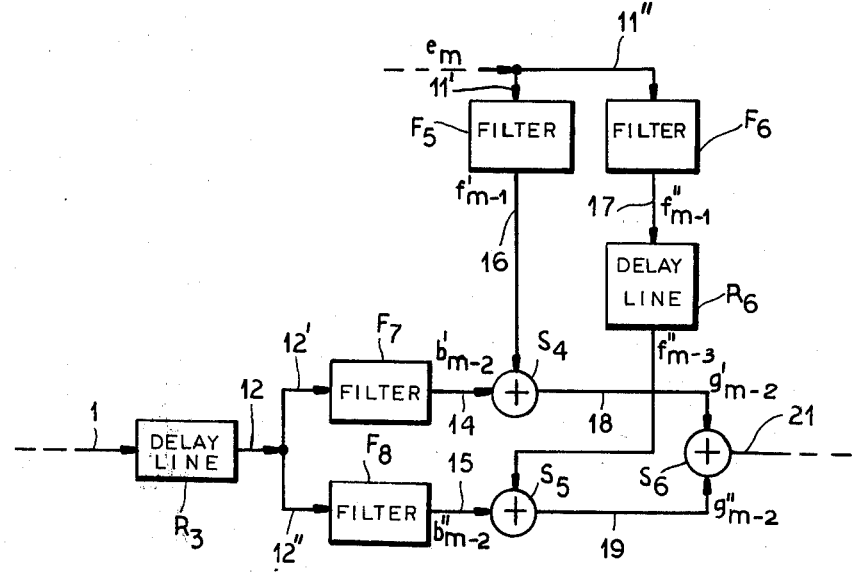
FIG. 5 is a block diagram showing a partial modification of the equalizer of FIG. 3.

As illustrated in FIG. 5, delay lines $R_4$ and $R_5$ may be replaced by a single delay line $R_6$ inserted between filter $F_6$ and adder $S_5$, this line introducing a lag of 2T into the train of feedback pulses emitted by filter $F_6$. Thus, at instant qT when the symbol $e_m$ is present on lead 11, leads 14 and 15 carry prefiltered signals $b'_{m-2}$ and $b''_{m-2}$ derived from sample $a_{m-2}$ arriving two periods T before the reception of sample $a_m$. At the same instant qT, delay line $R_7$ emits a postcursor-compensating feedback signal $f''_{m-3}$ derived from an incoming sample $a_{m-3}$ arriving over transmission path 1 at an instant (m−3)T. Adders $S_4$ and $S_5$ simultaneously emit purged signals $g'_{m-2}$ and $g''_{m-2}$ which are temporally correlated and can therefore be algebraically combined by adder $S_6$.

I claim:

1. An equalizer for eliminating the effects of postcursor and precursor interference from a periodically sampled train of incoming digital signals, comprising:
   receiving means connected to a transmission path carrying said incoming signals;
   a first circuit branch connected to said receiving means, said first branch including first filter means for converting a given signal sample into a first linearly prefiltered signal with at least partial suppression of postcursor effects, first threshold means connected to said first filter means for deriving a first quantized pulse from said first prefiltered signal, second filter means connected to said first threshold means for generating a precursor-compensating signal from said first quantized pulse, first delay means connected to said first filter means for emitting a retarded signal corresponding to said first prefiltered signal, and first adding means connected to said first delay means and to said second filter means for algebraically combining said retarded signal with said precursor-compensating signal to produce a first purged signal;
   a second circuit branch connected in parallel with said first circuit branch to said receiving means, said second branch including third filter means for converting said given signal sample into a second linearly prefiltered signal with at least partial suppression of precursor effects, second threshold means in a feedback loop with an input end downstream of said third filter means for deriving a second quantized pulse from said second prefiltered signal, fourth filter means in said feedback loop connected to said second threshold means for generating a postcursor-compensating signal from said second quantized pulse, second adding means upstream of said input end connected to said third and fourth filter means for algebraically combining said second prefiltered signal with said postcursor-compensating signal to produce a corrected feedback signal, and second delay means connected to said second adding means downstream of said input end for emitting a second purged signal temporally correlated with said first purged signal;
   summing means connected to said first and second branches for algebraically combining said first and second purged signals into a resulting signal; and
   decision means connected to said summing means for converting said resulting signal into a quantized output pulse.

2. An equalizer as defined in claim 1, further comprising a shaping filter inserted between said summing means and said decision means.

3. An equalizer as defined in claim 1 or 2, further comprising pulse-generating means connected to said decision means for deriving at least one corrective signal from said output pulse, circuit means connected to said receiving means in parallel with said first and second branches, algebraic means connected to said pulse-generating means and to said circuit means for superimposing said corrective signal upon a signal sample adjacent said given sample to produce a compensated signal, and other decision means connected to said algebraic means for quantizing said compensated signal.

4. An equalizer as defined in claim 3 wherein said pulse-generating means comprises fifth and sixth filter means connected in parallel for concurrently emitting a pair of corrective signals; said circuit means including a third and a fourth circuit branch respectively provided with seventh filter means for at least partially suppressing postcursor effects in said adjacent sample and eighth filter means for at least partially suppressing precursor effects in said adjacent sample; said algebraic means including third adding means in said third branch connected to said fifth filter means for receiving one of said corrective signals to produce a third purged signal, fourth adding means in said fourth branch connected to said sixth filter means for receiving the other of said corrective signals to produce a fourth purged signal, and additional summing means connected to said third and fourth adding means to combine said third and fourth purged signals into said compensated signal; said circuit means further including supplemental delay means for temporally correlating said corrective signals with said adjacent sample.

5. An equalizer as defined in claim 4 wherein said supplemental delay means comprises a common delay line inserted between said receiving means and said third and fourth branches.

6. An equalizer as defined in claim 5 wherein said supplemental delay means further comprises two additional delay lines, one of said additional delay lines being inserted between said common delay line and said seventh filter means, the other of said additional delay lines being inserted between said fourth adding means and said additional summing means.

7. An equalizer as defined in claim 5 wherein said supplemental delay means further comprises an additional delay line inserted between said sixth filter means and said fourth adding means.

* * * * *